United States Patent [19]

Engström

[11] 4,363,292

[45] Dec. 14, 1982

[54] FLUIDIZED BED REACTOR

[75] Inventor: Folke Engström, Karhula, Finland

[73] Assignee: A. Ahlstrom Osakeyhtio, Noormarkku, Finland

[21] Appl. No.: 200,766

[22] Filed: Oct. 27, 1980

[51] Int. Cl.[3] .............................................. F22B 1/02
[52] U.S. Cl. .................................. 122/4 D; 110/245; 165/104.16; 431/170
[58] Field of Search ....................... 110/263, 245, 347; 122/4 D; 165/104.16; 431/7, 170

[56] References Cited

U.S. PATENT DOCUMENTS

| | | | |
|---|---|---|---|
| 3,387,590 | 6/1968 | Bishop | 122/4 D |
| 3,763,830 | 10/1973 | Robinson et al. | 122/4 D |
| 3,893,426 | 7/1975 | Bryers | 122/4 D |
| 3,921,590 | 11/1975 | Mitchell et al. | 122/4 D |

FOREIGN PATENT DOCUMENTS 2152401 4/1972 Fed. Rep. of Germany .
1522601 8/1978 United Kingdom ................ 110/245

*Primary Examiner*—Edward G. Favors
*Attorney, Agent, or Firm*—Bucknam and Archer

[57] ABSTRACT

A fluidized bed reactor e.g. for the burning of fuels of different calorific values. The bottom part of the combustion chamber is divided into an outer and an inner fluidization zone by a partition wall adjacent to the distributor plate. Heat transfer surfaces are disposed in the outer fluidization zone. Heat can be withdrawn from the outer fluidization zone which is activated when burning fuel having a high calorific value. When burning fuel of lower calorific value the outer fluidization zone is not operated. The inner fluidization zone will be in operation in both cases. The supply of fluidizing gas to the second fluidization zone is controlled in order to maintain predetermined conditions in this zone.

5 Claims, 4 Drawing Figures

FLUIDIZED BED REACTOR

FIELD OF INVENTION

This invention relates generally to a fluidized bed reactor, wherein heat energy can be withdrawn from the fluidized bed by heat transfer surfaces and, more particularly, to a fast fluidized bed reactor which provides the heat for generating hot water or steam. The invention may be employed in a number of chemical as well as physical processes, such as combustion fo fuels, the roasting of pyrites or zinc concentrates etc.

BACKGROUND OF THE INVENTION

The use of fluidized beds has been recognised as an efficient means of generating heat. In these, air is passed through a perforated air distribution plate to fluidize the bed material and promote the combustion of the fuel. The heat produced by the combustion can be used to produce hot water or steam by means of heat transfer tubes, through which a heat exchange medium, such as water, flows. In a fast fluidized bed process air is forced through the air distributor plate and through the fluidized bed at a high velocity to cause fine particle materials to be entrained by the air, whereby a particle suspension is formed, the solid particle content of which continuously decreases from the distributor plate to the upper part of the reactor. The fast fluidized bed process offers a high heat transfer coefficient between the bed material and the heat transfer surfaces and achieves a reduction in boiler size compared with the use of a conventional fluidized bed.

A fluidized bed reactor is capable of burning fuels of different calorific values, but if different fuels have to be burned in the same reactor, then difficulties in maintaining the appropriate combustion temperature may arise. The combustor and its heat transfer surfaces will in this case be designed for the fuel of the lowest calorific value. Changing over from a low grade fuel to a high calorific fuel means that temperature in the combustor may rise to a point, where sintering of the bed material occurs. To avoid too high a temperature an air excess may be used to controll the combustion temperature. Another way may be to inject water to control the temperature. Both methods mean, however, heat losses and a decrease of the boiler efficiency.

The combustion of different fuels in the same combustor means also difficulties in designing the superheaters for a steam generating system. The location of the superheater is normally after the hot cyclone for low grade fuels. When burning a high grade fuel at the same capacity the flue gases have too low a temperature for sufficient superheating.

When burning high sufur coal the control of the combustion temperature is of the outmost importance to obtain an optimal absorption of $SO_2$ in the temperature range of 800°–950° C. utilizing limestone and/or dolomite as an absorbing agent. Combustion of high sulfur fuels causes also corrosion (sulfidation) of heat transfer surfaces. In this case a protection of the heat transfer surfaces from corrosive and sometimes also erosive conditions is of importance. Especially when the superheater is located in the bed zone.

The start-up of the combustor with heat transfer surfaces in the lower part may causes problems due to inefficient heat transfer from a over-bed burner. In this case inactivated heat transfer surface will facilitate the start-up procedure.

SUMMARY OF THE INVENTION

It is an object of the invention to provide a multi-fuel fluidized bed reactor.

It is another object of the invention to provide a fluidized bed reactor which is highly flexible, efficient and economical in operation with a minimum of maintenance required.

To fulfill these and other objects the fluidized bed reactor of the present invention comprises a housing forming a combustion chamber; a distributor plate provided with a plurality of orificies, disposed in the bottom part of said housing for introducing fluidizing gas into said combustion chamber; a partition wall which is disposed adjacent to the upper surface of the distributor plate, which defines a first and second fluidisation zone in the bottom part of said combustion chamber; means for supplying gas to a first wind box under a portion of the distributor plate through which gas is supplied to said first fluidisation zone; means for supplying gas to a second wind box under a portion of the distributor plate through which gas is supplied to said second fluidisation zone; and heat transfer surfaces disposed in said second fluidisation zone.

The heat transfer surfaces are used for withdrawing heat from the second fluidisation zone, thereby reducing the temperature in the combustion chamber when burning fuels having a high calorific value. Heat is withdrawn by means of a coolant such as water or steam, which flows in tubes or tube plates forming the heat transfer surfaces.

When burning fules of low calorific value, e.g. peat, oxygen containing fluidisation gas, such as air, is supplied only to the first fluidisation zone. The heat transfer surfaces in the second fluidisation zone are in contact with bed material which is not in motion. Substantially no heat is transferred to the heat transfer surfaces and no heat is removed.

When burning fuels of high calorific value, e.g. coal, fluidisation gas is supplied to both fluidisation zones. Also the bed material in the second fluidisation zone is fluidized and heat is transferred to the heat transfer surface and removed therefrom by means of a suitable coolant. Typically the coolant used is water which is converted into steam.

The flow rate of gas, such as air, to the second fluidisation zone where the heat transfer surfaces are, should preferably be such as to create an oxidizing atmosphere, although reducing conditions are prevailing in other parts of the combustion chamber. This reduces the corrosion of the heat transfer surfaces.

The supply of fluidizing gas to this zone may also be controlled in order to minimize the erosion of the heat transfer surfaces or to control the temperature in order to prorect the heat transfer surfaces or to achieve the optimum comditions for $SO_2$ absorption.

The second fluidisation zone is preferably at least partially enclosing the first fluidisation zone so as to form inner and outer fluidisation zones, the outer zone of which is activated when burning high calorific fuels.

The main advantage of the invention is that the fluidized bed reactor can be adapted in a very simple manner to fuels of varying calorific values.

BRIEF DESCRIPTION OF THE DRAWINGS

The invention will be described more fully and by way of ecamples with reference to the accompanying drawings. In the drawings.

DESCRIPTION OF PREFERRED EMBODIMENTS

Figure 1:
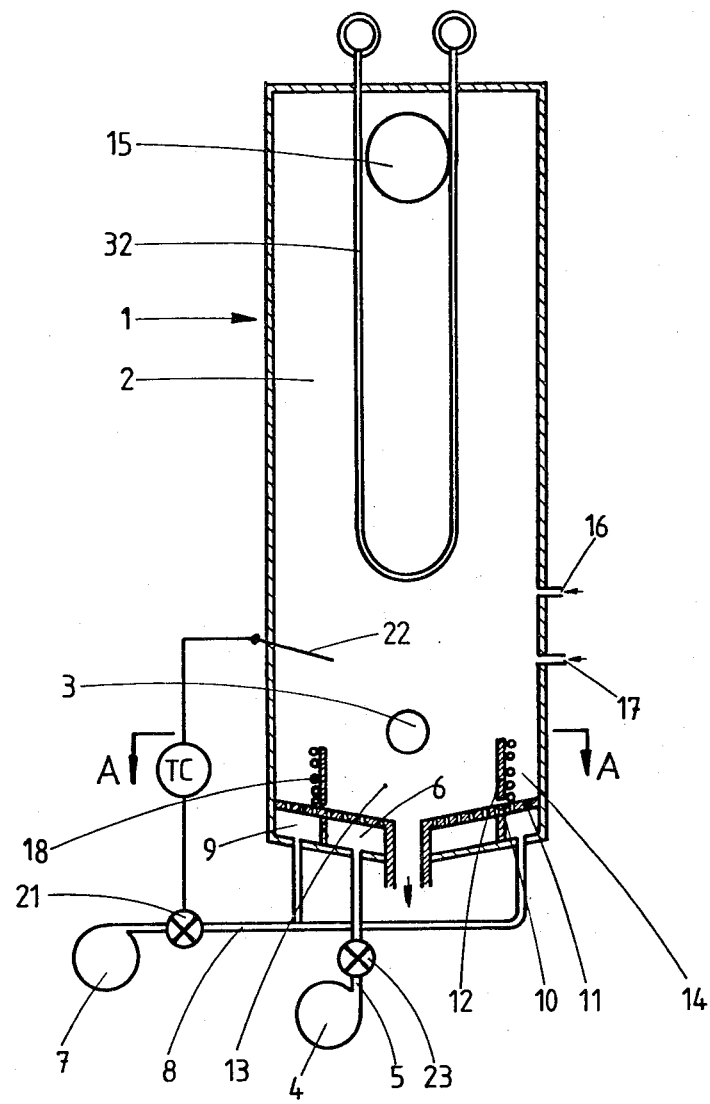
FIG. 1 is a diagrammatic sectional view of a fluidized bed reactor of the present invention.
Figure 2:
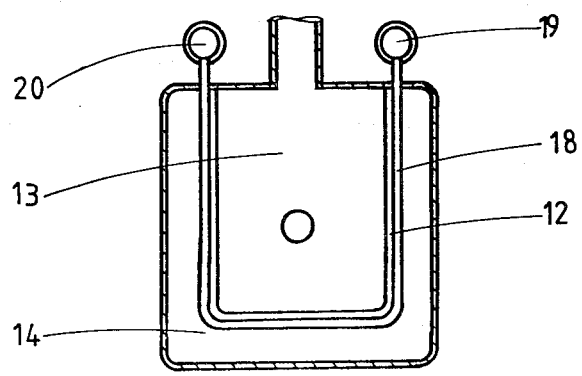
FIG. 2 is a cross-sectional view taken along line A—A of FIG. 1.

Referring to FIGS. 1 and 2 of the drawings, the reference number 1 refers generally to a multi-fuel fluidized bed reactor which uses a fluidized bed process. The fuel is burned in a combustion chamber 2, to which the fuel is supplied through an inlet in its lower part 3. The fuel is introduced into the inlet by conventional means (not shown). Oxygen containing gas, such as air, for fluidizing the bed material and supporting the combustion is supplied under pressure from a suitable blower 4 through a conduit 5 to a first wind box 6. Gas for fluidizing and combustion can also be supplied from a blower 7 through a conduit 8 to a second wind box 9. The wind boxes are disposed under a distributor plate 10 provided with orificies 11. A partition wall 12 is disposed adjacent to the distributor plate into a first fluidisation zone 13 and a second fluidisation zone 14 in the bottom part of the combustion chamber. The gas supplied to the wind boxes flows through the orificies 11 in the distributor plate at a high velocity and causes the bed material to fluidize and fine particles to be entrained by the gas. Particles entrained in the gas stream through the combustion chamber are removed by a separator, i.e. a cyclone (not shown) connected to an outlet 15 for the gases, located in the upper part of the reactor. The particles removed from the gases are recirculated to the fluidized bed reactor and introduced into the reactor through an inlet in the lower part of the reactor. Secondary gas is supplied through pipes 16 and 17.

A plurality of tubes 18 is disposed in the second fluidisation zone adjacent to the partition wall 12 and connected to headers 19 and 20. A heat transfer medium, such as water, is circulated through the tubes and heat from the second fluidisation zone can consequently be transferred to this transfer medium. The partition wall 12 is provided with a layer of thermal insulation to prevent heat exchange between the fluidisation zones through the wall.

A control valve 21 connected to a temperature sensor 22 in the combustion chamber controls the flow of gas from the blower 7 through the wind box 9 to the second fluidisation zone to maintain a constant temperature in the combustion chamber. Alternatively the temperature is measured in both fluidisation zones by temperature sensors (not shown) and the supply of gas to the second fluidisation zone is controlled, in order to maintain a constant but lower temperature there, e.g. 50° C. lower than in the first fluidisation zone. The feed rates of fuel and fluidizing gas to the first fluidisation zone is controlled by a control valve 23 so as to maintain there a substantially constant operating temperature, for instance 900° C.

As shown in FIG. 2 the second fluidisation zone surrounds the first fluidisation zone on three sides in such a way as to form an outer and an inner fluidisation zone. When fuel of low calorific value is burned, only the inner fluidisation zone 13 is active. To prevent an increase of the temperature in the combustion chamber, when fuel having a higher calorific value is supplied, also the outer fluidisation zone 14 is activated, whereby the heat transfer surfaces 18 are brought into contact with hot fluidized particles and heat is transferred to the coolant. The heat transfer will increase, when the fluidizing gas rate is increased. The temperature can consequently be maintained at a pre-determined level. The higher oxygen requirement which is due to the higher calorific value of the fuel is automatically met by the fact that more fluidizing gas is fed into the combustion chamber.

Figure 3:
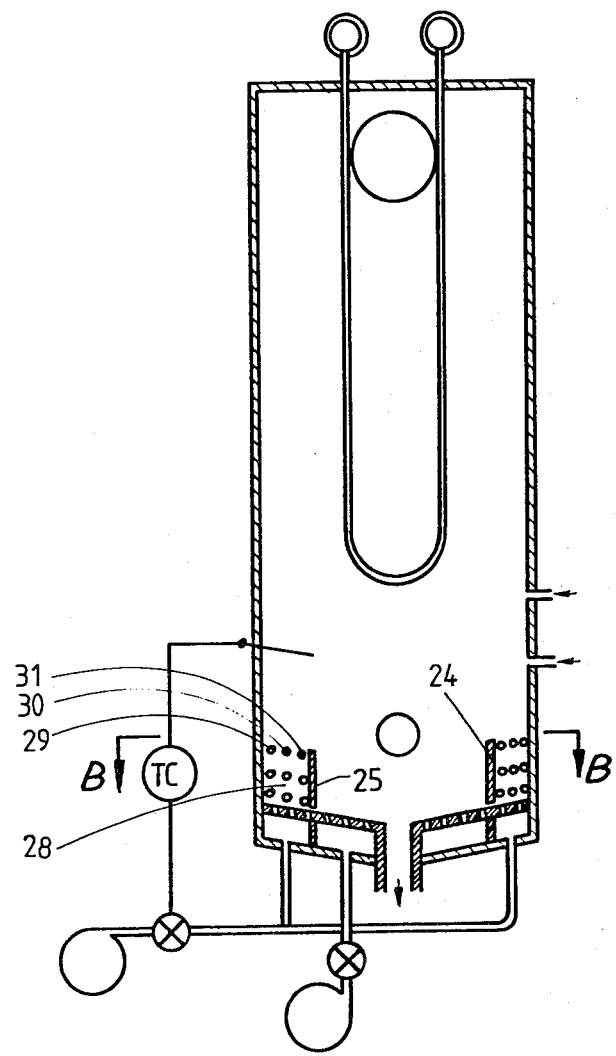
FIG. 3 is a diagrammatic sectional view of another embodiment of the invention.
Figure 4:
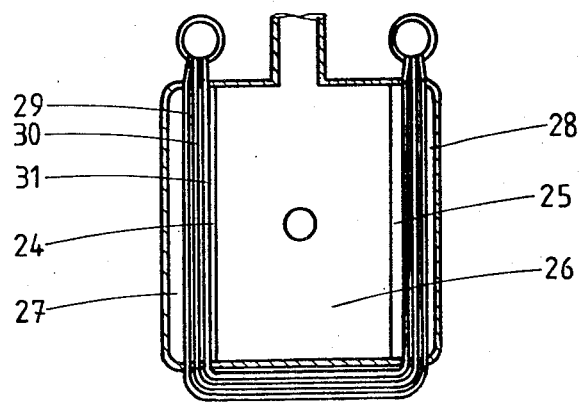
FIG. 4 is a cross-sectional view taken along line B—B of FIG. 3.

FIG. 3 and FIG. 4 show an alternative embodiment of the invention. The partition walls 24 and 25 divide the distributor plate in an inner fluidisation zone 26 and two outer fluidisation zones 27 and 28. The latter are connected to the same fluidizing gas supply system. The heat transfer surfaces are here formed of layers of tubes 29, 30 and 31, which are immersed in and pass through both outer fluidisation zones.

A great part of the heat of the gases in the combustion chamber is removed before the gases leave the combustion chamber by a conventional boiler tube system. For clarity of illustration only one tube 32 is shown in FIGS. 1 and 3. The tubes can form a contiguous wall-like structure which forms the walls of the combustion chamber or can be disposed in the combustion chamber. The tubes in the second fluidisation zone and the tubes in the combustion chamber are connected to the same steam generation system.

The invention will be further illustrated by the following examples.

EXAMPLE 1

Peat and coal were burned in a conventional fluidized bed reactor. The reactor was dimensioned for peat burning and contained 45 m² of heat transfer surfaces in the combustion chamber. The lower part of the combustion chamber contained no heat transfer surfaces.

1. Burning of peat

| | |
|---|---|
| Feed rate | 1,25 kg/s |
| Moisture content | 50% |
| Ash content | 5% |
| Calorific value | 9,2 MJ/kg |
| Temperature in the lower part | 800° C. |
| Temperature in the outlet | 930° C. |
| Excess air | 23% |
| Heat transfer in the reactor | 37,2% |
| Efficiency | 85,3% |

2. Burning of coal

The temperature in the lower part decreases in the lower part of the reactor and is cooled to 930° C. by combustion air.

| | |
|---|---|
| Feed rate | 0,86 kg/s |
| Moisture content | 9% |
| Ash content | 11% |
| Calorific value | 26 MJ/kg |
| Temperature in the lower part | 930° C. |
| Temperature in the outlet | 850° C. |
| Excess air | 23% |
| Heat transfer in the reactor | 52,1% |

| | |
|---|---|
| -continued | |
| Efficiency | 86,9% |

EXAMPLE 2

Peat and coal were burned in a fluidized bed reactor of the invention. FIGS. 3 and 4. The area of the outer fluidisation zone was 30% of the total fluidisation area. The outer fluidisation zones contained 6 m² of heat transfer surfaces and 45 m² were disposed in the upper part of the combustion chamber.

1. Burning of peat

Only the inner fluidisation zone is fluidized. Same process data as in example 1.

2. Burning of coal

| | |
|---|---|
| Feed rate | 0,857 kg/s |
| Moisture content | 9% |
| Ash content | 11% |
| Calorific value | 26 MJ/kg |
| Temperature in the lower part | 900° C. |
| Temperature in the outlet | 850° C. |
| Excess air | 23% |
| Heat transferred in the upper part of the reactor | 52,1% |
| Heat transferred in the outer fluidisation zone | 7,9% |
| Efficiency | 88,4% |

Of course, variations of the specific arrangement of the fluidized bed reactor as disclosed above can be made without departing from the invention as defined in the following claims.

What is claimed is:

1. A fast fluidized bed multifuel reactor comprising: a housing forming a combustion chamber, a distributor plate provided with a plurality of orificies disposed in the bottom part of said housing for introducing fluidizing gas into said combustion chamber, at least one partition wall which is disposed adjacent to the upper surface of the distributor plate, which defines a first and second fluidization zone in the bottom part of said combustion chamber, means for operating only the first fluidization zone or both the first and the second fluidization zone, means for supplying gas to a first wind box disposed under a portion of the distributor plate through which gas is supplied to said first fluidization zone, means for supplying gas to a second wind box under a portion of the distributor plate through which gas is supplied to said second fluidization zone, heat transfer surfaces disposed in said second fluidization zone connected to a steam generator system, cooling means within the combustion chamber located above the part of the first fludization which is free of internal obstructions, said cooling means being connected to the same steam generation system, to which said heat transfer surfaces are connected, wherein said second fluidization at least partially encloses said first fluidization zone forming an inner fluidization zone.

2. A fluidized bed reactor as defined in claim 1, wherein said inner fluidisation zone is of rectangular shape and is enclosed on two sides by outer fluidisation zones.

3. A fluidized bed reactor as defined in claim 1 including means for controlling the flow of gas to said second wind box connected to a temperature sensor disposed in said combustion chamber to maintain a predetermined temperature in the combustion chamber.

4. A fluidized bed reactor as defined in claim 1, wherein said heat transfer surfaces are disposed adjacent to the partition wall.

5. A fluidized bed reactor as defined in claim 1, wherein said first fluidisation zone represents a major portion of said distributor plate.

* * * * *